(12) United States Patent
Edelstein et al.

(10) Patent No.: US 8,525,169 B1
(45) Date of Patent: Sep. 3, 2013

(54) RELIABLE PHYSICAL UNCLONABLE FUNCTION FOR DEVICE AUTHENTICATION

(75) Inventors: Daniel C. Edelstein, White Plains, NY (US); Stephen M. Gates, Ossining, NY (US); Edward W. Kiewra, Verbank, NY (US); Satyanarayana V. Nitta, Poughquag, NY (US); Ramachandran Muralidhar, Mahopac, NY (US); Dirk Pfeiffer, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,289

(22) Filed: Aug. 10, 2012

(51) Int. Cl.
*H01L 21/66* (2006.01)
*H01L 21/74* (2006.01)

(52) U.S. Cl.
USPC .............. 257/48; 438/17; 365/46; 380/44

(58) Field of Classification Search
None
See application file for complete search history.

(56) References Cited

U.S. PATENT DOCUMENTS

| | | |
|---|---|---|
| 7,653,197 B2 | 1/2010 | Van Dijk |
| 7,681,103 B2 | 3/2010 | Devadas |
| 7,741,721 B2 | 6/2010 | Black |
| 7,868,606 B2 | 1/2011 | Meterelliyoz |
| 7,898,283 B1 | 3/2011 | Koushanfar |
| 8,054,098 B2 | 11/2011 | Koushanfar |
| 8,214,777 B2 | 7/2012 | Joshi |
| 8,347,091 B2 | 1/2013 | Nonaka |
| 2006/0221686 A1 | 10/2006 | Devadas et al. |
| 2007/0038871 A1 | 2/2007 | Kahlman |
| 2008/0231418 A1 | 9/2008 | Ophey |
| 2008/0256600 A1 | 10/2008 | Schrijen |
| 2008/0258216 A1 | 10/2008 | Kikuchi |
| 2009/0083833 A1 | 3/2009 | Ziola |
| 2009/0153841 A1 | 6/2009 | Ophey |
| 2010/0090714 A1 | 4/2010 | Van Geloven et al. |
| 2010/0127822 A1 | 5/2010 | Devadas |
| 2011/0317829 A1* | 12/2011 | Ficke et al. ................. 380/46 |

FOREIGN PATENT DOCUMENTS

| | | |
|---|---|---|
| WO | WO 2005/041000 A1 | 5/2005 |
| WO | WO 2006/021911 A1 | 3/2006 |

OTHER PUBLICATIONS

S. Cho, Technical Challenges in TSV Integration to Si, Sematech Symposium Korea, Oct. 27, 2011.*
Dries Schellekens et al., "Embedded Trusted Computing with Authenticated Non-volatile Memory," Lecture Notes in Computer Science, 2008, vol. 4968, Trusted Computing—Challenges and Applications, pp. 60-74.

(Continued)

*Primary Examiner* — Thomas L Dickey
*Assistant Examiner* — Joseph Schoenholtz
(74) *Attorney, Agent, or Firm* — Louis Percello

(57) ABSTRACT

The present disclosure relates to a secure device having a physical unclonable function. The device includes an integrated circuit having a semiconducting material in at least one via in a backend of the integrated circuit. The present disclosure also relates to a method for manufacturing a secure device having a physical unclonable function. The method includes providing an integrated circuit and adding a semiconducting material to at least one via in a backend of the integrated circuit. In some instances a property of the semiconducting material in the at least one via is measured to derive a signature.

23 Claims, 4 Drawing Sheets

(56) References Cited

OTHER PUBLICATIONS

Sean Smith et al., Building a High-Performance, Programmable Secure Coprocessor, IBM Research Report, Computer Science/Mathematics, RC 21102 (94393) Feb. 19, 1998. Total of 60 pages.
G. Edward Suh et al., "Physical Unclonable Functions for Device Authentication and Secret Key Generation," DAC 2007, Jun. 4-8, 2007, San Diego, California, coy consists of 6 unnumbered pages.
Tsutomu Matsumoto et al., "Studying LSI Tamper Resistance with Respect to Techniques Developed for Failure Analysis," Matsumoto-Nakajima-Shibata-Yamagishi, Physical Security Testing Workshop, Hawaii, Sep. 26-29, 2005.
Sergei P. Skorobogatov et al., "Optical Fault Induction Attacks," In Proceedings of CHES '02 Revised Papers from the 4th International Workshop on Cryptographic Hardware and Embedded Systems, pp. 2-12, 2003.
Luke Teyssier, "Strong Encryption and Correct Design are not Enough: Protecting Your Secure System from Side Channel Attacks," DesignCon 2010, pp. 1-18.
Travis Spann, "Fault Induction and Environmental Failure Testing," NIST CMVP Physical Security Conference, Sep. 16, 2005, pp. 1-11.
M. Breitwisch, "Novel Lithography-Independent Pore Phase Change Memory," 2007 Symposium on VLSI Technology Digest of Technical Papers, pp. 100-101.
James S. IM, "Single-crystal Si films for thin-film transistor devices," Appl. Phys. Lett. 70 (25) Jun. 23, 1997, 1997 American Institute of Physics, pp. 3434-3436.
Oliver Kommerling et al., "Design Principles for Tamper-Resistant Smartcard Processors," Proceedings of the USENIX Workshop on Smarcard Technology (Smartcard '99), Chicago, Illinois, May 10-11, 1999, USENIX Association, pp. 9-20.
Mesut Meterelliyoz, et al., "A High Sensitivity Process Variation Sensor Utilizing Sub-threshold Operation," IEEE 2008 Custom Intergrated Circuits Conference (CICC), pp. 125-128.
Peter Gutmann, "Data Remanence in Semiconductor Devices," In Proceedings of the 10th conference on USENIX Security Symposium—pp. 1-19.
Belyansky et al., "Low Temperature Borophosphosilicate Glass (BPSG) Process for High Aspect Ratio Gap Fill"—Electronics Soc. 146, 5, 1999—1 page.
McIntyre et al., "Interface Layers for High-k/Ge Gare Stacks: Are they Necessary?" ECS Transactions, 3 (7) (2006) Copyright the Electrochemical Society pp. 519-530.

\* cited by examiner

US 8,525,169 B1

RELIABLE PHYSICAL UNCLONABLE FUNCTION FOR DEVICE AUTHENTICATION

FIELD OF THE DISCLOSURE

The present disclosure relates to device authentication, and more particularly to physical unclonable functions for integrated circuits.

BACKGROUND OF THE DISCLOSURE

Hardware based "Root of Trust" is a fundamental building block for any secure computing system. Key elements of secure computing require authentication, sending data to an authorized source, and/or loading data onto a designated device. In general, cryptographic keys in binary code form the basis of securing data and bit streams. Typically, such cryptographic keys are stored in non-volatile memory and are present on an integrated circuit (IC) at all times. If an attacker can extract the key from a device, the entire foundation for secure computing is in jeopardy. For example, an attacker with physical access to the device can delayer a chip, and read out the stored code based on the state of the transistors. Thus, securing cryptographic keys requires anti-tamper technologies, which may be relatively expensive and may therefore not be suitable for implementation in various devices like field programmable gate arrays (FPGAs), mobile devices, and sensors.

SUMMARY OF THE DISCLOSURE

Embodiments of the present disclosure disclose secure devices and methods for manufacturing such devices. For example, in one embodiment a device having a physical unclonable function includes an integrated circuit having a semiconducting material in at least one via in a backend of the integrated circuit. The semiconducting material forms at least one structure representing the physical unclonable function. Similarly, in another embodiment, a method for manufacturing a secure device having a physical unclonable function includes the steps of providing an substrate for the secure device and forming at least one structure representing the physical unclonable function in at least one via of the substrate. The structure is formed by depositing a semiconducting material in a backend of the substrate in at least one via. In still another embodiment, a method for manufacturing a secure device having a physical unclonable function includes depositing a semiconducting material in a backend of at least one via of an integrated circuit. The semiconducting material forms at least one structure representing the physical unclonable function. The method then measures a physical property of the semiconducting material in the at least one via to derive a signature.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
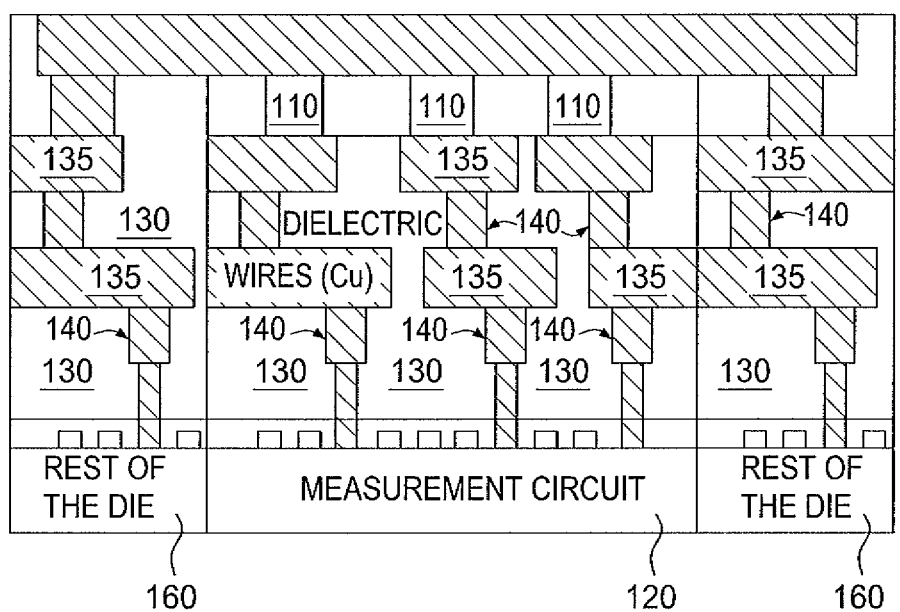
FIG. 1 illustrates an exemplary device comprising an integrated circuit, according to embodiments of the present disclosure.

Embodiments of the present disclosure disclose secure devices having unique physical properties, or physical unclonable functions (PUFs) for storing secret codes used for authentication and key generation. A physical unclonable function comprises a set of unique analog values from structures and materials that can be measured on chip (e.g., by a measurement circuit) followed by conversion to a code, or key, in binary form. The present disclosure describes a set of unique materials and structures that can be used as physical unclonable functions. For example, a device having a unique physical unclonable function according to embodiments of the present disclosure may include an integrated circuit and a semiconducting material, such as silicon, forming a structure in at least one via in a backend of the integrated circuit. The structure comprising the semiconducting material represents a physical unclonable function. As such, physical properties of the semiconducting material can then be measured to derive a signature (e.g., by way of one or more analog response measurements), from which a binary key can be further derived. Placing semiconducting material in the backend has several advantages as described below. It should be noted that although exemplary embodiments are described herein in connection with semiconducting silicon, the present disclosure is not so limited. Namely, other, further and different embodiments may similarly be manufactured and used which incorporate other semiconducting materials, such as germanium, carbon, chalcogenide glass, alloys of silicon with germanium and/or carbon (e.g., silicon carbide (SiC) silicon-germanium (SiGe), silicon-germanium-carbon (SiGeC)), titanium dioxide ($TiO_2$), III-V semiconductors (such as aluminum arsenide (AlAs), gallium arsenide (GaAs), aluminum indium arsenide (AlInAs), aluminum nitride (AlN), gallium nitride (GaN), and the like), group II-VI semiconductors (e.g., zinc oxide (ZnO), cadmium sulfide (CdS), and the like), or other materials which change crystallographic phase when exposed to a laser.

One of the principles behind a PUF is that the cryptographic key(s) are not stored in binary form when the chip is powered down but are hidden in form of unique physical analog identifiers within the hardware so that the code can only be executed on a designated authorized uncompromised IC. Thus, when a circuit is turned on, the structures comprising the PUF can be measured and the analog values converted into a binary code, or key using an on chip measurement circuit. For example, a measurement circuit may be employed on chip such as that described in Suh, et al. "Physical Unclonable Functions for Device Authentication and Secret Key Generation", Proceedings of the $44^{th}$ Design Automation Conference, San Diego, Calif., June 2007, which is incorporated by reference herein in its entirety. However, if the chip is turned off, the binary code is not stored in any memory, but is implicit in the properties of the chip.

Prior approaches to using physical unclonable functions for authentication and key generation focus on device structures that have been optimized during manufacturing to have reduced variability, since the usual intent is high performance and reproducibility. However, if an array of device(s) used to provide a physical unclonable function has a narrow variability range close to a cutoff threshold set by a measurement device used to compute a binary code from the physical unclonable function, any slight change over time and temperature may result in bit errors. The threshold set by the measurement circuit may determine whether to categorize various values of the signature as ones or zeros. In this way, a key, such as in the form of a binary code, can be derived from the signature, the key comprising an identifier that is unique to the device and that can be used for authenticating the device. However, it may be a particular problem when a particular analog value is close to a threshold. If the analog value changes, even slightly, then the signature can change. For instance, the value can be read as a one, whereas it should be read as a zero. It is possible to deal with this problem using error correction bits. However, this may reduce the security of the code because the greater redundancy and error tolerance in the code, the less reliable it is as a security mechanism.

In contrast to the foregoing, various embodiments of the present disclosure purposefully increase the variability in the measurable physical properties of a semiconducting material, such as silicon. This may be undesirable in the front end silicon, with the actual transistors, gates and/or circuits, where uniformity (and predictable performance) is desired. However, semiconducting silicon is not typically found in the backend of an integrated circuit (or a chip, wafer, package, and the like). Rather, the backend of a typical integrated circuit comprises a dielectric or other insulating materials with one or more vias passing through the dielectric. The vias may contain wiring, typically comprised of copper and a diffusion barrier liner surrounding the copper. Thus, silicon in the backend is not currently used for any purpose, and is therefore free to be manipulated.

In some embodiments, the variability is created by performing a laser anneal on the semiconducting material. This induces the semiconducting material to form variable, or random, patterns of recrystallization. Similarly, in some embodiments, the variability of the physical properties of the semiconducting material can be increased through several standard patterning processes, such as lithography, reactive ion etching, or chemical mechanical planarization, or by exposing the semiconducting material to varying ambient conditions, such as by exposing the semiconducting material to varying levels of dopant, during a manufacturing process of the device. These patterning processes can induce physical variations (variations in the physical dimensions of the structure) in the creation of patterns, such as vias, and therefore enhance the variability of the resulting structure representing the PUF. In some embodiments, the locations on a device used for the PUF may also be varied form one device to the next. This is in contrast to the typical manufacturing process for the front end silicon, which seeks to provide as uniform conditions as possible to reduce variability.

Compared to prior approaches for physical unclonable functions, embodiments of the present disclosure have a wide range/variability in measurable physical properties (e.g., voltage response, capacitance response, inductance response, etc.), and provide PUFs with greater reliability and with less susceptibility to bit errors. By increasing the variability of the physical properties, the likelihood is reduced that a particular value is at or near a threshold of a measurement device used to compute a binary code from the physical unclonable function. Thus, even if the PUF changes due to temperature or aging, it is less likely that a binary key derived from the PUF will drift significantly over time and temperature. The variability achievable through embodiments of the present disclosure is significant enough to provide a great number of unique PUFs (in the millions or greater) for a wide variety of devices. In addition, the number of PUF values achievable is large enough avoid attackers guessing specific patterns.

To aid in understanding the present disclosure, FIG. 1 illustrates a cross-section of an exemplary device 100 (e.g., a substrate or integrated circuit and a measurement circuit) related to embodiments of the present disclosure. In particular, device 100 includes a substrate, or die 160 which may be comprised of crystalline silicon, gallium arsenide (GaAs) or other semiconductors, as well as other materials for forming transistors, resistors, capacitors and other structures. Although the example of FIG. 1 refers to a die 160, the present disclosure is not so limited. For example, the die may be one of many dies (chips) that may be formed from a common wafer or substrate. Thus, embodiments of the present disclosure may incorporate a wafer or substrate prior to separation of multiple dies. The die 160, which forms part of the front end of the integrated circuit, may include an on chip measurement circuit 120 which reads one or more physical properties of the silicon used for the PUF, as described in further detail below. The backend of an integrated circuit typically includes insulating materials, e.g., dielectric 130, and copper wiring formed in traces, or lines 135 which are connected vertically by vias 140. The backend is a multi-layer interconnect structure which includes wiring for transporting signals between transistors in the front end. Also, the interconnects provide supply voltages, ground, and signals travelling off the integrated circuit. In various embodiments of the present disclosure, a semiconducting material is added to at least one via in the backend. As illustrated in FIG. 1, three of the vias 140 have deposited therein added silicon 110 (e.g., semiconducting silicon). According to various embodiments of the present disclosure, the added silicon 110 in the backend forms the basis for a physical unclonable function. In alternate embodiments, the added silicon is in the form of lines, or traces, rather than vias.

For example, in one embodiment, the measurement circuit 120 may read one or more physical properties of the added silicon 110 in order to determine a signature of the physical unclonable function. For instance, the measurement circuit 120 may receive measurements of various responses of the added silicon 110 to a stimuli (e.g., a voltage response, capacitance response, resistance response, impedance response, a transmittance, or the like). In the embodiment of FIG. 1, the measurement circuit 120 may measure the response of the added silicon 110 by applying one or more signals to the silicon through wires in the vias 140. In some embodiments, the measurement circuit 120 comprises a voltage controlled ring oscillator. In other embodiments, different forms of on chip measurement circuits may be employed. For example, one such on chip measurement device, or sensing device, is described in U.S. patent application Ser. No. 12/032,100, filed Feb. 15, 2008 (Publication No. 2009/0206821 published Aug. 20, 2009), which is incorporated by reference herein in its entirety. The response of the silicon may be considered a signature of the added silicon 110 (in other words, a physical unclonable function).

Figure 4:
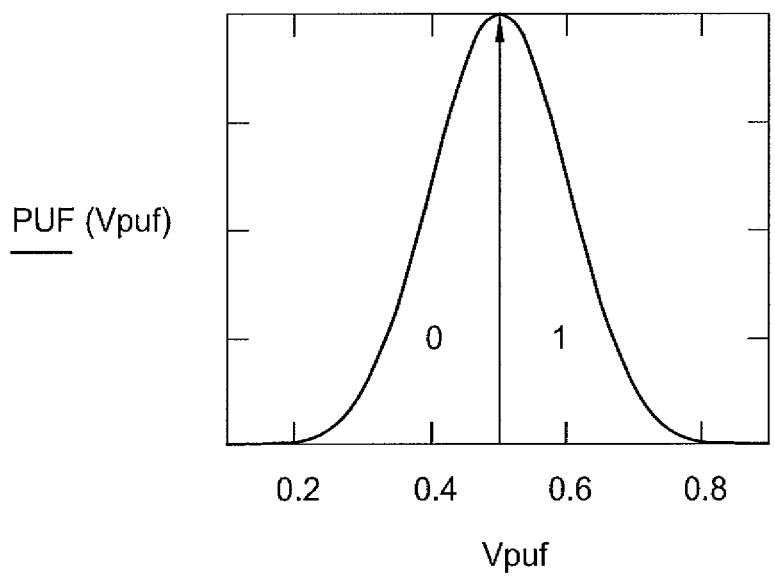
FIG. 4 illustrates an exemplary graph for determining binary keys from physical unclonable function values.

FIG. 4 illustrates an exemplary graph 400 showing a Gaussian distribution of a number of PUF devices versus PUF values/signature values (Vpuf) of the devices, and a cutoff for determining binary keys (e.g., ones and zeros) from physical unclonable function values of the PUF devices. In this case, FIG. 4 may illustrate a cutoff of 0.5 for determining whether a particular PUF value of a PUF device is a one or a zero. The horizontal axis represents Vpuf (the PUF value, which in one embodiment may comprise a threshold voltage, Vt, of the PUF device) and the vertical axis represents the number of PUF devices exhibiting the particular PUF value. For example, in a manufacturing process, an ideal PUF device may have a threshold voltage of 0.5. Thus, a manufacturer would generally prefer a yield with as many devices having a PUF value as close to 0.5 as possible (i.e., little to no variation). However, by implementing the purposeful variability enhancements of the present disclosure, a wider yield curve may be achieved where many more PUF devices (in this case, semiconducting material deposited in one or more vias in the backend of one or more substrates or integrated circuits) have PUF values greater than or less than 0.5. Notably, in the example of FIG. 4, the cutoff for determining whether a PUF value is a one or a zero may be 0.5. Any value measured below 0.5 will be categorized as a zero whereas any value measured above 0.5 may be categorized as a one. It should be noted that when the PUF value (Vpuf) is close to the cutoff (e.g., 0.5), changes in temperature and changes over time may cause the PUF value to fluctuate and therefore cause a bit error in the binary key. Thus, the further the PUF value of a particular PUF device can be made away from the cutoff, the less likely it is that time and temperature changes will cause the PUF value to cross the threshold and switch from a zero to a one, or vice versa; hence, the more stable the binary key over time. In addition, although FIG. 4 may relate to PUF values derived from a voltage response (e.g., threshold voltage (Vt)), in other embodiments PUF values may be derived from other measurable properties, such as, resistivity, capacitance, impedance or transmittance, among other things. As such, similar cutoffs may be applied to such other values to distinguish between ones and zeros.

Figure 2:
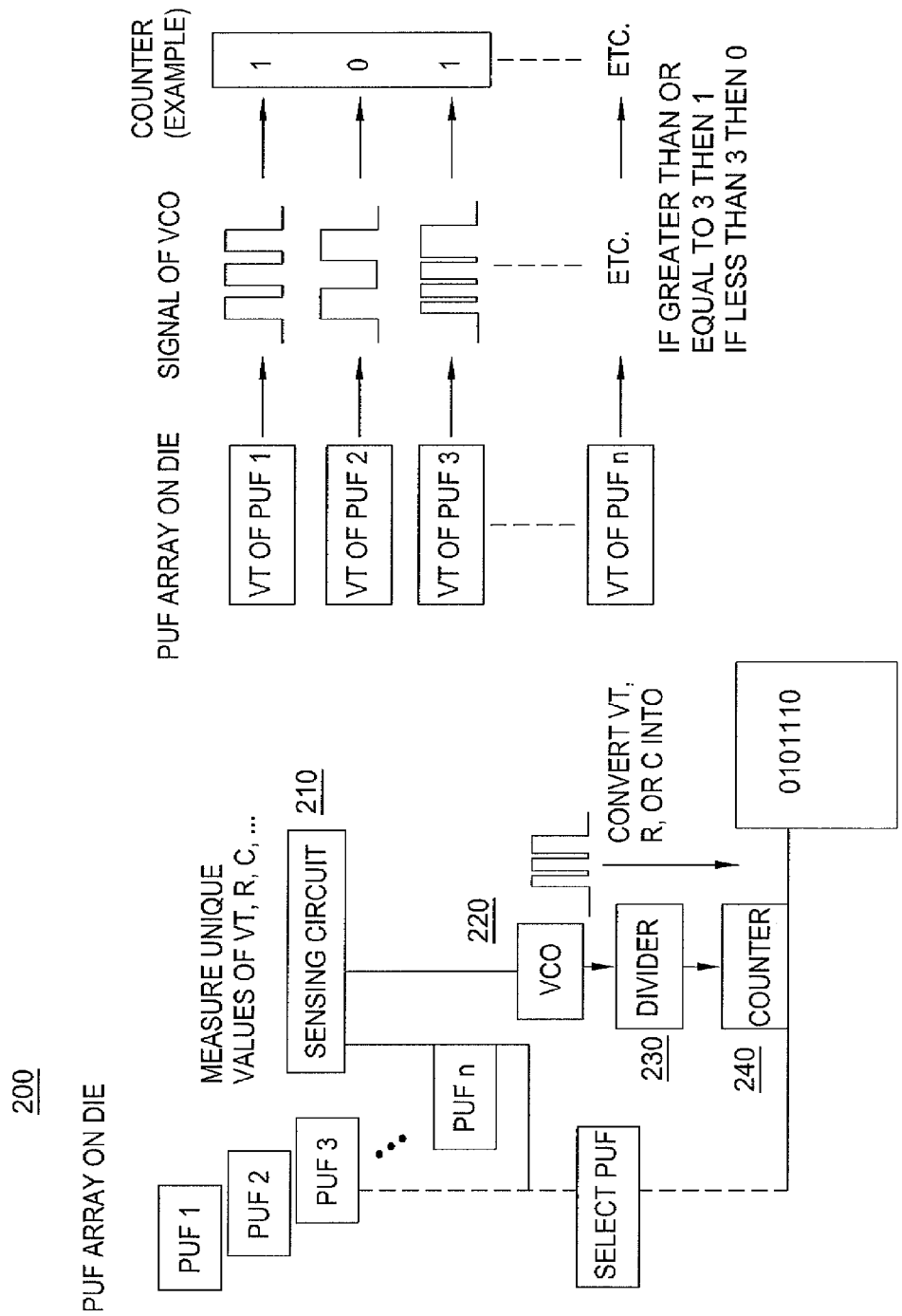
FIG. 2 illustrates the operation of an exemplary measurement circuit, according to embodiments of the present disclosure.

FIG. 2 depicts the operation of an exemplary measurement circuit (e.g., measurement circuit 120 in FIG. 1) according to various embodiments of the present disclosure. In particular, the embodiment of FIG. 2 may comprise an on chip measurement circuit (i.e., located within the integrated circuit itself, such as on a die of the integrated circuit) that is configured to measure a resistance response, a capacitance response, a voltage response, etc. of one or more PUF devices, i.e., structures" or regions (in this case, semiconducting material deposited in one or more vias in the backend of an integrated circuit) comprising a physical unclonable function. As shown in the left side of FIG. 2, a measurement circuit 200 includes a sensing circuit 210, a voltage controlled oscillator 220, a divider 230 and a counter 240. In one embodiment, the sensing circuit 210 measures one or more structures, or regions of semiconducting material in the backend of an integrated circuit (e.g., PUF1, PUF2, PUF3 . . . PUFn, as shown in FIG. 2). The response(s) of the one or more regions of semiconducting material representing the physical unclonable function is used by the sensing circuit to convert the PUF values(s) into a voltage value, or values which will influence the oscillation frequency of the voltage controlled oscillator 220. In some embodiments, the output of the voltage controlled oscillator 220, which may be representative of the PUF value(s) of the one or more regions of semiconducting material being measured, is received by the divider 230. The divider 230 and the counter 240 convert the signal of the voltage controlled oscillator that is influenced by the PUF value via the sensing circuit into a digital value, or binary representation. For example, the PUF value correlates to the period, or the number of cycles/oscillations in a given time, of the voltage controlled oscillator signal 220. The period is observed/determined by the counter 240 in order to decide if a particular PUF value should be categorized as a "1" or a "0". This process is repeated over one or more structures/regions of semiconducting material being measured in order to create a binary set. According to various embodiments, this binary set (also referred to herein as a code, or key), is used as a cryptographic key to authenticate a device. Notably, the code is never stored in binary form on the measurement device. It should also be noted that although a binary based key is described, the present disclosure is not so limited. Namely, other, further, and different embodiments may be incorporated in a ternary based system, and the like.

In the right side of FIG. 2, the responses of various individual PUF devices are represented by the PUF values Vt of PUF1, Vt of PUF2, etc., in the first column. The PUF values will influence, through the sensing circuit 210, the number of oscillation periods produced by the voltage controlled oscillator 220, which will then be counted by the counter 240 to determine the binary value. The threshold for distinguishing the binary values can be set by the counter 240 counting the oscillation periods.

One embodiment may also include a temperature sensor and circuitry implementing a temperature compensation algorithm to account for variations in operating temperature of the device. For example, PUF values may vary with respect to temperature over a range of interest. Thus, the temperature compensation algorithm may account for predictable changes to the PUF values with respect to a stable temperature reference. In addition, although one example of an on chip measurement circuit is depicted and described in connection with FIG. 2, in other, further and different embodiments a measurement circuit may be employed that takes various other forms. For example, a measurement circuit may be employed such as that described in Suh, et al., "Physical Unclonable Functions for Device Authentication and Secret Key Generation", Proceedings of the 44$^{th}$ Design Automation Conference, San Diego, Calif., June 2007, or U.S. patent application Ser. No. 12/032,100, filed Feb. 15, 2008 (Publication No. 2009/0206821 published Aug. 20, 2009), each of which is incorporated by reference herein in its entirety.

As mentioned above, in various embodiments, the variability of the semiconducting material in the backend used for the physical unclonable function is increased using a laser anneal. For example, in one embodiment, a laser anneal process involves the use of an excimer laser to recrystallize the semiconducting material to yield a morphology of various grain sizes. The random grain size distribution ultimately affects the variability of the resulting device. In other words, by varying the grain size and grain distribution, this results in variations in the measurable properties of the semiconducting material and hence, leading to more reliable creation of the binary key/secret code value. In one embodiment, the laser anneal comprises the application of a 30 ns UV laser pulse. In some cases, a laser anneal on the semiconducting material results in local melting of the semiconducting material, or hotspots (at or near the area of excitation), which allows dopants to diffuse and penetrate the semiconducting material to various extents. Upon cooling, the semiconducting material recrystallizes, fixing dopants in the crystalline lattice of the semiconducting material, and resulting in a wide range of electrical properties. In some embodiments, the conditions of the laser anneal can be purposefully changed to induce variations within the semiconducting material. For example, the exciting laser wavelength, energy, beam width, pulse duration and other laser properties can all be varied (e.g., from one region of semiconducting material to the next).

In some embodiments, a laser anneal is performed within the backend interconnects without modifying an interlayer dielectric (e.g., dielectric 130 in FIG. 1) by selecting the energy of the laser as well as by applying localized heat. In essence, the anneal may be performed through the backend, without cooking off the backend. In addition, using semiconducting material in regions of unused vias in the backend allows the anneal to be performed on the semiconducting material without destroying the remainder of the backend. However, in other embodiments, the anneal may be performed through the front end. For example, one could anneal the semiconducting material (e.g., silicon 110 in FIG. 1) in process, before adding on the last layers of the backend.

As an alternative, or in conjunction with a laser anneal, variability may further be achieved through several patterning processes, such as lithography, reactive ion etching, or chemical mechanical planarization. In still other embodiments, variability may also be increased by exposing the semiconducting material to various ambient conditions during a manufacturing process, such as varying the quantities of available dopant, the types of dopant, the ambient temperature, ambient oxygen levels, and the like. As a result, a wide range of variations, substantially random, in the physical and electrical properties of the semiconducting material can be achieved when the semiconducting material recrystallizes. This range of variations can be exploited in measuring the semiconducting material when used as a physical unclonable function, resulting in more stable keys derived therefrom, and thus less bit errors.

In addition, using semiconducting material in the backend of an integrated circuit as a physical unclonable function allows some embodiments to include the PUF structures directly atop of the measurement circuit(s) generating the binary keys from the PUF values. For example, as shown in FIG. 1, the measurement circuit 120 is situated on chip, in the front end directly below the region of the backend including the added silicon 110 that is to be used as a PUF. By placing the measurement circuit and the PUF in two different layers, it makes it more difficult to probe and access the PUF than where the measurement circuit and the PUF are on the same layer. Having the measurement circuit sit below the PUF in the backend may further deter attacks seeking to extract signatures/keys because in order to reach the silicon, the attacker needs to separate the measurement circuit from the backend (i.e., there is no direct access to the PUF). However, without the functioning measurement circuit, the attacker will not know which properties to measure, which stimuli to apply, which regions to apply the stimuli to, etc. In addition, an attacker cannot access the PUF directly through the backend because there is no wiring connections to the backside. Further, if an attacker does try to access the PUF from the backside through delayering, it will inevitably alter the physical properties of the semiconducting material sufficiently enough (e.g., due to exposure to air, light/radiation, etc.) to change the signature and key, thereby rendering the device useless. In other words, to see the measurement circuit or PUF, it is necessary to destroy one to access the other. Accordingly, such embodiments of the present disclosure provide a tamper response. If the PUF device and the measurement device/support circuitry are stacked on top of each other, access is blocked from any direction. Therefore, if an attacker tries to get physical access to a PUF signature/key by delayering, probing, or other established failure analysis methods, the PUF and/or measurement circuit is altered or even destroyed in such a way as to prevent regeneration of the key.

In addition, in some embodiments, the backend of an exemplary integrated circuit comprises a number of layers of chip interconnect structure, which may have numerous vias, and associated wiring passing through such layers. Accordingly, in various embodiments, regions of semiconducting material deposited in the vias in the backend may be deposited in various layers, forming a "three-dimensional" PUF. For instance, as shown in the embodiment of FIG. 1, it appears that all three regions of silicon 110 are in a single horizontal layer. In contrast, in some embodiments these regions of silicon 110 may be at different horizontal layers in the vias 140 of the backend of the device 100. In addition, the layers in which different portions of the semiconducting material are deposited in various vias can be varied from one device to the next (e.g., in a manufacturing environment producing hundreds and thousands of copies of essentially the same IC). While a measurement circuit that is integrated with the IC (such as shown in FIG. 1) will be able to perform response measurements on the semiconducting material deposits at various layers in the backend, an attacker trying to gain access to such a PUF will have a much harder time, as several layers will need to be separately delayered in order to gain access to all of the silicon regions which comprise the PUF. However, if an attacker tries to delayer the IC, the physical properties will change (e.g., due to exposure to air, light/radiation, etc.). Thus, the attacker will not be able to recover the key when the IC is delayered.

In some embodiments, for example in a large array, the location(s) of the silicon structures that are included in the PUF can be varied, randomly or otherwise, so that from one device to the next, the location(s) of the PUF are not necessarily the same. For example, when many unused vias are available, less then all available vias can be used to deposit the added semiconducting material. In addition, the set of vias where the added semiconducting material is deposited can be varied from one device to the next. Thus, an attacker may not know where to look for a PUF signature going from chip to chip. In other words, this increases the difficulty of an attacker's task many-fold.

While embodiments have been described above where semiconducting material is placed in the backend of an integrated circuit (e.g., in one or more vias), it should be noted that other embodiments of the present disclosure are no so limited. In particular, various embodiments of the present disclosure may apply a laser anneal, apply patterning processes, such as lithography, reactive ion etching, or chemical mechanical planarization, vary ambient conditions, such as temperatures, dopant levels and oxygen levels, and perform other manipulations to front end semiconducting material. For instance, a portion of a chip may be unused for transistors, gates, logic circuits, etc., and be designated for use as a PUF. In contrast to prior approaches which simply accept the random variability of the chip, the variability of designated regions is purposefully increased by the methods disclosed herein (e.g., through laser anneal and/or varying exposure to ambient conditions). While certain advantages of having the silicon in the backend may not be available, such embodiments still provide a PUF that is more stable in the face of aging, temperature fluctuations and other conditions, and is less prone to bit errors. In addition, as used herein the term "via" may also be understood to include a "trace," which is also a backend structure that typically includes wiring. In other words, the present disclosure is not strictly limited to semiconducting material in a "via" but also include semiconducting material deposited in one or more backend structures that may also be considered to be traces or lines. As mentioned above, it should be further noted that although embodiments have been described herein which implement structures formed of silicon deposits as PUFs, the present disclosure is not specifically limited to the use of semiconducting silicon. Other semiconducting materials that may be used in various embodiments include: germanium, carbon, alloys of silicon with germanium and/or carbon, titanium dioxide ($TiO_2$), III-V semiconductors (such as aluminum arsenide (AlAs), gallium arsenide (GaAs), aluminum indium arsenide (AlInAs), aluminum nitride (AlN), gallium nitride (GaN), and the like), and group II-VI semiconductors (e.g., zinc oxide (ZnO), cadmium sulfide (CdS), and the like).

Still, further and different embodiments may comprise physical unclonable functions based on such novel materials as chalcogenide glass (used for phase change memory), and other materials which change crystallographic phase when exposed to a laser. For example, a chalcogenide glass may exhibit wide resistance ranges between crystalline and amorphous states. In general, a chalcogenide includes one or more elements from group 16 of the periodic table, such as sulfur, selenium, or tellurium. Thus, in various embodiments, a PUF may be comprised of doped $Ge_2Sb_2Te_5$, AsS, $As_2S_3$, and various other phase change materials. In some embodiments, the resistance of regions of the chalcogenide glass may be programmed to different levels. In some embodiments, variations in physical properties of the chalcogenide glass (e.g., surface structures, lattice structures, random or variable hotspots for recrystallization, etc.) can be induced by laser anneal, as described above. These variations provide measurable differences in the physical properties of the chalcogenide glass as a basis for use as a PUF. In particular, a signature and key can be derived from the chalcogenide glass using a measurement circuit, as described above, or other suitable means. Similarly, in some embodiments, chalcogenide glass can be deposited in vias in the backend of an integrated circuit, as described above. In short, silicon, materials suitable for use as phase change memory, other semiconductors, and numerous similarly suitable materials are incorporated in embodiments of the present disclosure for use as PUFs.

Figure 3:
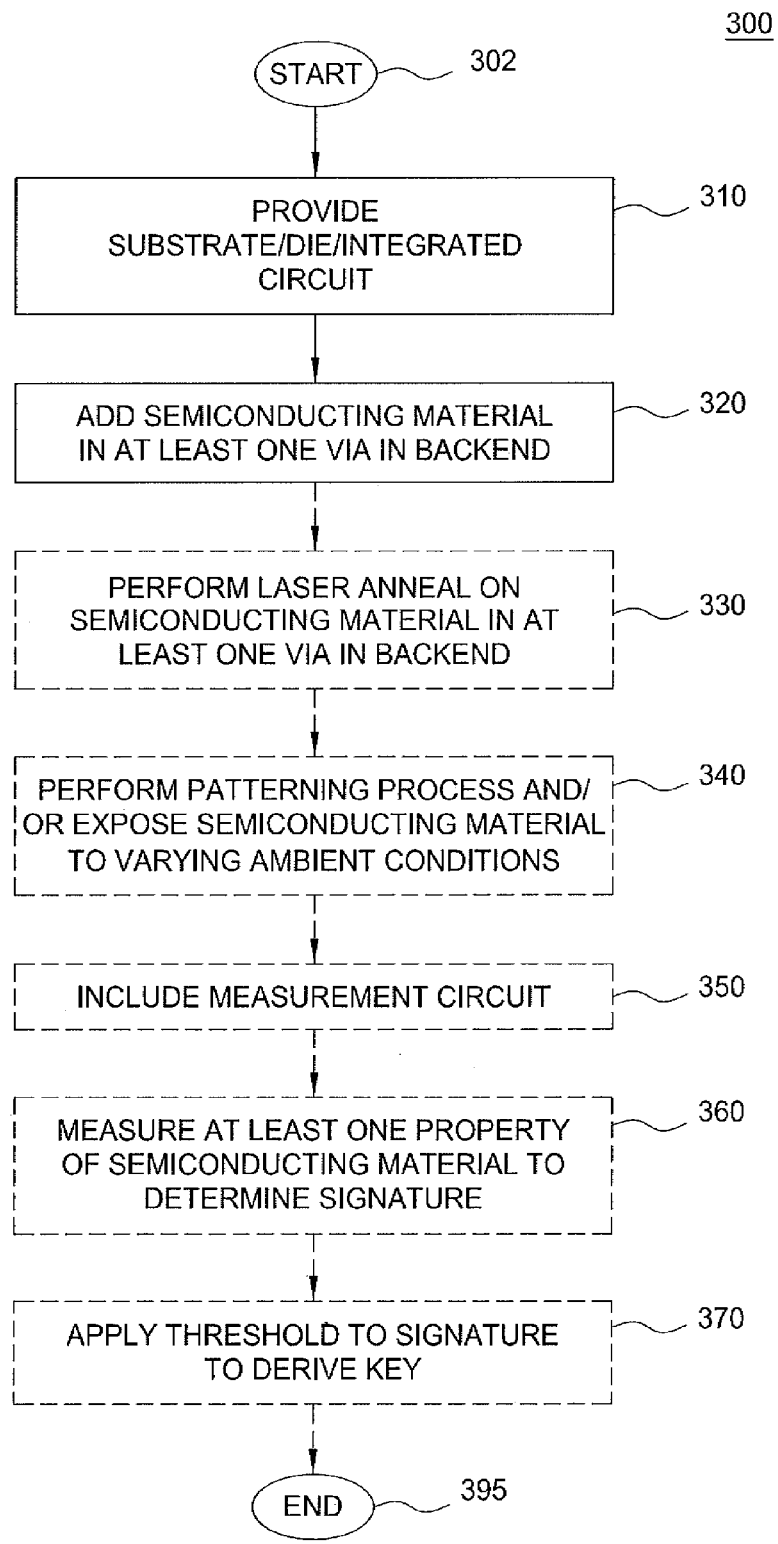
FIG. 3 is a flowchart of a method for manufacturing an exemplary device, according to embodiments of the present disclosure.

FIG. 3 illustrates a flowchart of a method 300 for creating a secure device having a physical unclonable function. In particular, exemplary steps of the method 300 may be performed in accordance with the above described embodiments.

The method 300 begins at step 302 and proceeds to step 310 where the method provides a substrate/die. For example, a substrate/die may be the basis for one or more integrated circuits, each of which may comprise a front end layer of semiconducting material (e.g., silicon), along with other materials, and having formed therein a number of transistors, gates, nets, and the like. The integrated circuit may also comprise a number of backend layers including a dielectric or other insulating materials, vias, and wiring connecting various elements in the front end to each other, to ground, and to power sources, among other things. An exemplary integrated circuit is illustrated in FIG. 1 and described above.

At step 320, the method 300 adds semiconducting material in at least one via in the backend of the integrated circuit. For example, as described above, an integrated circuit may include a number of vias in the backend. The vias are essentially holes or gaps in a dielectric layer which can be filled with copper wiring for making connections. However, many of the vias may be unused. Accordingly, in various embodiments, semiconducting material is added into one or more of the unused vias to from structures representing one or more physical unclonable functions. In some embodiments, the semiconducting material is deposited in the one or more vias using a deposition technique. For example, the semiconducting material may be deposited using an electron beam induced deposition, a focused ion beam induced deposition, and similar techniques. In one embodiment, the semiconducting material is added to a given layer in the backend during a manufacturing process. For example, as shown in FIG. 1, an integrated circuit includes a number of layers in the backend, and the added semiconducting material may be placed in a via in any one or more of these layers. Accordingly, in some embodiments the semiconducting material is added at the same time the given layer is fabricated, before adding any additional layers and/or the final protective layers of the backend.

In various embodiments, the semiconducting material added at step 320 is used as a physical unclonable function. For example, a measurement circuit can determine various physical properties of the semiconducting material and derive a signature and key therefrom. Accordingly, in some cases, steps 330-370 of the method 300 may be performed following step 320. However, not all of these steps need be performed in an exemplary process for forming a secure device in accordance with the method 300. Thus, in some embodiments, following step 320 the method 300 proceeds to step 395, where the method ends. However, in some embodiments, the method 300 proceeds to step 330.

At step 330, the method 300 performs a laser anneal on the semiconducting material added in step 320. For example, a laser anneal may be performed in accordance with any of the techniques described above. As described above in connection with step 320, in some embodiments, the semiconducting material may be added at the same time a given layer is fabricated, before adding any additional layers. Accordingly, in such embodiments, the laser anneal of step 330 is performed after the semiconducting material is added/deposited at step 320, but before additional layers are added. This may reduce the possibility of damaging any other components of the integrated circuit during the anneal. However, in some embodiments, the anneal is performed through the backend, after all of the layers of the integrated circuit have been added. For example, it is possible to excite semiconducting material in one or more layers in the backend using a laser pulse without cooking off the backend. In addition, in some embodiments an anneal is performed through the front end; however care must be exercised in not damaging any transistors, nets or other necessary components. As described above, a laser anneal of the semiconducting material induces the semiconducting material to decrystallize and recrystallize in local regions of excitation, and results in a morphology of varying grain sizes in the semiconducting material. All of these variations lead to a range of physical properties that varies from one "structure" or region of the semiconducting material to the next. Various laser properties can be modified during the anneal including beam width, wavelength, pulse duration, and the like, which leads to much variability in the properties of the semiconducting material, and hence variability in the analog PUF value(s) of the semiconducting material.

Next the method 300 may proceed to step 340, where at least one variability enhancement is performed on the semiconducting material. In one embodiment, the at least one variability enhancement comprises performing a patterning process on the semiconducting material added at step 320 and/or exposing the semiconducting material to one or more varying ambient conditions. For example, as an alternative, or in addition to a laser anneal at step 330, the method 300 may expose the semiconducting material added at step 320 to any one or more patterning processes, such as lithography, reactive ion etching, or chemical mechanical planarization. The method 300 may further expose the semiconducting material to varying quantities of one or more dopants, which may diffuse through the semiconducting material and be bound in the lattice upon recrystallization. In addition, at step 340 the method 300 may further vary such things as the ambient temperature, ambient oxygen levels, and the like. These patterning processes or variations in ambient conditions can be applied at the same time the semiconducting material is deposited/added at step 320, or simultaneous with the laser anneal at step 330. As a result, a wide range of variations, substantially random, in the physical and electrical properties of the semiconducting material can be achieved when the semiconducting material recrystallizes. This range of variations can be exploited in measuring the silicon when used as a physical unclonable function, resulting in more stable keys derived therefrom, and thus less bit errors.

Accordingly, in some embodiments, the method 300 proceeds to step 350 where the method includes a measurement circuit with the integrated circuit provided at step 310. Exemplary measurement circuits are described above in connection with FIGS. 1 and 2. In addition, in accordance with some of the above described embodiments, the measurement circuit may be placed on chip in a front end, at the transistor level (e.g., as shown in FIG. 1) directly below a region of the backend containing the silicon added to the one or more unused vias at step 320. Placing the measurement circuit below the region of the backend used for a physical unclonable function structure has the advantage that in order to gain access to the semiconducting material added at step 320, an attacker needs to either (1) separate the measurement circuit from the backend in order to gain access to the layers in the backend (which will destroy the measurement circuit) or (2) attempt to access the added semiconducting material directly from the backside of the IC, which will alter the particular characteristics of the silicon that form the basis for a physical unclonable function.

In some embodiments, following step 350 the method 300 proceeds to step 360 where the method measures at least one physical property of the semiconducting material to determine a signature. The measurements may be performed using the measurement circuit added at step 350. Specifically, in some embodiments, the measurement circuit is configured to measure/detect various properties of the semiconducting material as described above in connection with the exemplary measurement circuit 200 in FIG. 2. For instance, the method 300 may measure the voltage response, inductance response, resistance response, capacitance response, and other properties of the semiconducting material added at step 320 in order to derive a signature therefrom. The signature may comprise one or more analog values reflecting the response of a particular region of the semiconducting material to an applied signal.

Following step 360, the method 300 may further proceed to step 370 where the method applies a threshold to the signature to derive a key. For example, as mentioned above, the signature of the semiconducting material added at step 320 may comprise one or more analog waveforms representing the response(s) of the one or more structures/regions of the semiconducting material to applied signals. Accordingly, in one embodiment the method 300 derives a signature by using a counter to count the oscillations/period of the voltage controlled oscillator signal, or similar means. In addition, a threshold may be applied, such as shown in the example of FIG. 4, to derive a binary representation. In various embodiments, the set of binary representations that is output forms a key for the integrated circuit which may be used for cryptographic and authentication purposes, among other things. For instance, the key may be stored in random access memory (RAM). Thereafter, a processor may access the key from the RAM in order to perform various computations. Since RAM is volatile, when the device's power is shut off, the key is automatically erased from the RAM. Every time the device/chip is turned on, the key needs to be regenerated (e.g., by way of the method 300). It should be noted that although a binary based key is described, the present disclosure is not so limited. Namely, other, further, and different embodiments may be incorporated in a ternary based system, and the like.

At step 395, the method 300 terminates. Accordingly, the steps of the method 300 produce a secure device comprising an integrated circuit having a physical unclonable function (in the form of semiconducting material deposited to form structures in the backend). In some embodiments, the secure device includes a measurement circuit for purposes of extracting a key from the properties of the semiconducting material that can be used for cryptographic and authentication purposes.

Although embodiments have been described above in connection with the method 300 above where the semiconducting material is placed in the backend of a substrate or integrated circuit (e.g., in one or more vias), it should be noted that other embodiments of the present disclosure are no so limited. For instance, a portion of the front end semiconducting material of a chip may be unused for transistors, gates, logic circuits, etc., and be designated for use as a PUF, which may be annealed or otherwise manipulated in accordance with the above disclosures. Similarly, although the method 300 has been described in connection with semiconducting material deposits, such as silicon, the method 300 is not limited to any particular semiconducting materials. Thus, in various embodiments, at step 320 the method 300 may deposit one or more of a variety of semiconducting materials, such as chalcogenide glass (used for phase change memory), and other materials which change crystallographic phase when exposed to a laser. In addition, although the steps of the method 300 are listed in a particular order, as shown in FIG. 3, it should be noted that alternate embodiments of the present disclosure may implement these steps in a different order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents. In addition, although various embodiments which incorporate the teachings of the present disclosure have been shown and described in detail herein, those skilled in the art can readily devise many other varied embodiments that still incorporate these teachings.

What is claimed is:

1. A method of providing a secure device having a physical unclonable function, the method comprising:
   providing a substrate for the secure device;
   forming at least one structure representing the physical unclonable function in at least two vias of the substrate, wherein the forming comprises depositing a semiconducting material in a backend of the substrate in the at least two vias;
   measuring at least one property of the semiconducting material for deriving a signature having one or more physical unclonable function values; and
   deriving a binary key from the signature, wherein the binary key is derived by applying a threshold to the one or more physical unclonable function values for conversion into a binary code.

2. The method of claim 1, wherein the semiconducting material comprises at least one of silicon, chalcogenide glass, germanium, carbon, an alloy of silicon with germanium, an alloy of silicon with carbon, an alloy of silicon with germanium and carbon, titanium dioxide, zinc oxide, a III-V semiconductor or a II-VI semiconductor.

3. The method of claim 1, further comprising:
performing a laser anneal on the semiconducting material prior to the measuring and the deriving.

4. The method of claim 1, further comprising:
exposing the semiconducting material to at least one varying ambient condition or performing at least one patterning process on the semiconducting material during a manufacturing process of the device;
wherein the at least one varying ambient condition comprises at least one of:
a varying level of an available dopant;
a varying temperature; or
a varying level of oxygen; and
wherein the at least one patterning process comprises at least one of:
a lithography process;
a reactive ion etching process; or
a chemical mechanical planarization process.

5. The method of claim 1,
wherein the at least one property comprises at least one of:
a resistivity;
a capacitance;
an impedance;
an inductance;
a transmittance; or
a voltage response.

6. The method of claim 5, wherein the at least one property of the semiconducting material is measured by a measurement circuit.

7. The method of claim 6,
wherein the deriving the binary key from the signature is performed by the measurement circuit.

8. The method of claim 6, wherein the measurement circuit is located in a region of a front end of the device below a region of the backend containing the at least two vias.

9. The method of claim 1, wherein the backend comprises a number of layers, and wherein the semiconducting material is deposited in at least two of the number of layers.

10. A method of providing a secure device having a physical unclonable function, the method comprising:
depositing a semiconducting material in at least two vias in a backend of an integrated circuit, the semiconducting material forming at least one structure representing the physical unclonable function;
measuring at least one property of the semiconducting material in the at least two vias to derive a signature; and
deriving a binary key from the signature, wherein the binary key is derived by applying a threshold to one or more physical unclonable function values for conversion into a binary code.

11. The method of claim 10, wherein the semiconducting material comprises at least one of silicon, chalcogenide glass, germanium, carbon, an alloy of silicon with germanium, an alloy of silicon with carbon, an alloy of silicon with germanium and carbon, titanium dioxide, zinc oxide, a III-V semiconductor or a II-VI semiconductor.

12. The method of claim 10, further comprising:
performing a laser anneal on the semiconducting material.

13. The method of claim 10, further comprising:
exposing the semiconducting material to at least one varying ambient condition or performing at least one patterning process on the semiconducting material during a manufacturing process of the device;
wherein the at least one varying ambient condition comprising at least one of:
a varying temperature;
a varying level of oxygen; or
a varying level of an available dopant; and
wherein the at least one patterning process comprises at least one of:
a lithography process;
a reactive ion etching process; or
a chemical mechanical planarization process.

14. The method of claim 10, wherein the deriving is performed by a measurement circuit.

15. The method of claim 14, wherein the measurement circuit is located in a region of a front end of the integrated circuit below a region of the backend containing the at least two vias.

16. The method of claim 10, wherein the measuring the at least one property of the semiconducting material is performed by a measurement circuit.

17. The method of claim 16, wherein the measurement circuit is located in a region of a front end of the integrated circuit below a region of the backend containing the at least two vias.

18. The method of claim 10, wherein the backend comprises a number of layers, and wherein the semiconducting material is deposited in at least two of the number of layers.

19. A method of providing a device having a physical unclonable function, the method comprising:
providing an integrated circuit comprising a semiconducting material;
performing a laser anneal on a portion of the semiconducting material to increase a variability of at least one property of the portion of the semiconducting material;
measuring the at least one property of the portion of the semiconducting material for deriving a signature having one or more physical unclonable function values; and
deriving a binary key from the signature, wherein the binary key is derived by applying a threshold to the one or more physical unclonable function values for conversion into a binary code.

20. A device having a physical unclonable function, the device comprising:
an integrated circuit;
a semiconducting material in at least one via in a backend of the integrated circuit, the semiconducting material forming at least one structure representing the physical unclonable function;
a measurement circuit that measures at least one property of the semiconducting material for deriving a signature having one or more physical unclonable function values; and
a key derivation mechanism that derives a binary key from the signature by applying a threshold to the one or more physical unclonable function values for conversion into a binary code.

21. The device of claim 20, wherein the semiconducting material comprises at least one of silicon or chalcogenide glass.

22. The device of claim 20, wherein the semiconducting material is recrystallized via a laser anneal.

23. The device of claim 20, wherein the semiconducting material is exposed to at least one varying ambient condition or is subjected to at least one patterning process during a manufacturing process of the device;

wherein the at least one varying ambient condition comprising at least one of:
  a varying temperature;
  a varying level of oxygen; or
  a varying level of an available dopant; and
wherein the at least one patterning process comprises at least one of:
  a lithography process;
  a reactive ion etching process; or
  a chemical mechanical planarization process.

* * * * *